US006466368B1

(12) United States Patent
Piepel et al.

(10) Patent No.: US 6,466,368 B1
(45) Date of Patent: Oct. 15, 2002

(54) REAR PROJECTION SCREEN WITH REDUCED SPECKLE

(75) Inventors: Andrew J. Piepel, Hudson, WI (US); Robert S. Moshrefzadeh, Oakdale, MN (US); Patrick A. Thomas, Maplewood, MN (US); Thomas R. Gehring, Mahtomedi, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/560,267

(22) Filed: Apr. 26, 2000

(51) Int. Cl.$^7$ .................. G03B 21/60; G03B 21/56; G02B 27/10
(52) U.S. Cl. .................. 359/456; 359/452; 359/453; 359/455; 359/460; 359/619
(58) Field of Search .................. 359/456, 452, 359/453, 455, 460, 619, 457

(56) References Cited

U.S. PATENT DOCUMENTS

| 2,378,252 A | 6/1945 | Staehle et al. ............... 359/453 |
| 3,705,575 A | 12/1972 | Huber .......................... 350/126 |
| 3,719,412 A | 3/1973 | Reiback ....................... 350/117 |

(List continued on next page.)

FOREIGN PATENT DOCUMENTS

| EP | 0 859 270 | 8/1998 |
| WO | WO98/45753 | 10/1998 |
| WO | WO99/64927 | 12/1998 |
| WO | WO99/64928 | 12/1998 |
| WO | WO99/50710 | 10/1999 |

OTHER PUBLICATIONS

George, Nicholas and Atul Jain, "Speckle from a Cascade of Two Diffusers", Optics Communications, vol. 15, No. 1, pp 71–75 (Sep. 1975).

Gabor, D., "Laser Speckle and Its Elimination", IBM J. Res. Develop., pp. 509–514 (Sep. 1970).

Lowenthal, Serge and Denis Joyeux, "Speckle Removal by a Slowly Moving Diffuser Associated with a Motionless Diffuser", J. Opt. Soc. Am., vol. 61, No. 7, pp. 847–851 (Jul., 1971).

Kozma, Adam and Charles R. Christensen, "Effects of speckle on resolution", J. Opt. Soc. Am., vol. 66, No. 11, pp. 1257–1260 (Nov. 1976).

Rawson, Eric G., Antonio B., Nafarrate, and Rober E. Norton, "Speckle–Free Rear–Projection Screen Using Two Close Screens in Slow Relative Motion", J. Opt. Soc. Am., vol. 66, No. 11, pp 1290–1294 (Nov. 1976).

George, Nicholas, C. R. Christensen, J. S. Bennett, and B. D. Guenther, "Speckle Noise in Displays", J. Opt. Soc., Am., vol. 66, No. 11, pp 1282–1290 (Nov. 1976).

"Speckle from a cascade of two thin diffusers" Shirley, et al. Journal of the Optical Society of America; vol. 6, No. 6.

"Rear Projection Screens for light Valve Projections Systems" Goldenberg, et al., SPIE vol. 3013, pp. 49–59, 1997.

Projections Displays; Stupp, et al.; John Wiley & Sons, Chichester, 1999, pp. 168–172.

"Perceived Speckle Reduction in Projection Display Systems" IBM Technical Disclosure Bulletin, pp. 9–12, vol. 40, Pub. No. 7, Jul. 1997.

*Primary Examiner*—David M. Gray
*Assistant Examiner*—Magda Cruz
(74) *Attorney, Agent, or Firm*—Altera Law Group, LLC; Stephen W. Buckingham

(57) ABSTRACT

A rear projection screen has one or more internal layers that reduce the speckle perceived by a viewer. A screen assembly has a light-source side and a viewing side. The assembly includes a screen layer to disperse light passing through the screen from the light source side and a matte surface disposed on the viewing side of the screen assembly to reduce ambient glare. A first speckle contrast reducing layer is disposed between the screen layer and the matte surface to reduce speckle formed at the matte surface.

34 Claims, 12 Drawing Sheets

U.S. PATENT DOCUMENTS

| | | | |
|---|---|---|---|
| 3,893,748 A | 7/1975 | DePalma et al. | 350/128 |
| 3,902,787 A | 9/1975 | Sherlock | 350/127 |
| 3,996,051 A | 12/1976 | Meyerhofer | 430/355 |
| 4,035,068 A | 7/1977 | Rawson | 353/122 |
| 4,053,208 A | 10/1977 | Kato et al. | 350/117 |
| 4,066,332 A | 1/1978 | Kato et al. | 359/453 |
| 4,083,626 A * | 4/1978 | Miyahara et al. | 350/117 |
| 4,087,835 A | 5/1978 | Nishimura et al. | 348/779 |
| 4,143,943 A | 3/1979 | Rawson | 350/120 |
| 4,361,382 A | 11/1982 | Miyoshi et al. | 359/453 |
| 4,390,239 A | 6/1983 | Huber | 359/446 |
| 4,401,368 A | 8/1983 | Drechsel et al. | 350/126 |
| 4,679,900 A | 7/1987 | McKechnie et al. | 359/453 |
| 4,730,897 A * | 3/1988 | McKechnie et al. | 350/128 |
| 4,762,393 A | 8/1988 | Gerritsen et al. | 359/456 |
| 5,066,099 A | 11/1991 | Yoshida et al. | 359/457 |
| RE33,795 E | 1/1992 | Ogino | 353/74 |
| 5,170,287 A | 12/1992 | Ludwig, Jr. et al. | 359/452 |
| 5,289,311 A | 2/1994 | McClelland et al. | 359/457 |
| 5,434,706 A | 7/1995 | Mitani et al. | 359/457 |
| 5,451,103 A | 9/1995 | Hatanaka et al. | 353/31 |
| 5,457,572 A | 10/1995 | Ishii et al. | 359/457 |
| 5,543,870 A | 8/1996 | Blanchard | 353/74 |
| 5,563,738 A | 10/1996 | Vance | 359/614 |
| 5,661,600 A | 8/1997 | Mitani et al. | 359/457 |
| 5,675,435 A | 10/1997 | Ishii et al. | 359/460 |
| 5,760,955 A * | 6/1998 | Goldenberg et al. | 359/456 |
| 5,781,344 A * | 7/1998 | Vance | 359/614 |
| 6,011,643 A * | 1/2000 | Wunderlich et al. | 359/279 |
| 6,147,801 A | 11/2000 | Goldenberg et al. | 359/456 |
| 6,163,402 A * | 12/2000 | Chou et al. | 359/443 |
| 6,172,814 B1 * | 1/2001 | Watanabe et al. | 359/619 |
| 6,307,675 B1 * | 10/2001 | Abe et al. | 359/457 |

\* cited by examiner

REAR PROJECTION SCREEN WITH REDUCED SPECKLE

FIELD OF THE INVENTION

The invention relates to rear projection screens, and more particularly to a rear projection screen having reduced speckle.

BACKGROUND

Rear projection screens are increasingly being used for projection displays in, for example, televisions, computer monitors, and other types of displays. The major optical characteristics of a rear projection screen include optical gain, viewing angle, contrast, and resolution. It is also important that the screen be free from optical defects, such as Moiré patterns, and color and speckle defects. Speckle defects can occur when light transmitted by a particular portion of the screen is mutually coherent with light transmitted by a neighboring portion of the screen. The mutually coherent light from neighboring portions of the screen interferes as it propagates away from the screen. A viewer's eye integrates such interference over the whole screen, with the result that the viewer sees a number of bright spots across the screen, referred to as speckle, which decrease the viewability of the image projected from the screen.

A measure of speckle is the speckle contrast, which is defined as the ratio of the standard deviation of the pixel brightness over the average pixel brightness. If the speckle contrast of a screen is above a certain level, the speckle in the viewed image can be significantly distracting to the viewer. Accordingly, it is important to reduce the speckle contrast to a level acceptable to the viewer while substantially preserving other screen characteristics.

When screens are designed to enhance one or more particular characteristic it is often found that other characteristics are spoiled, or the cost of the screen assembly, or its complexity, is increased. For example, the introduction a component to the screen for reducing glare may adversely affect one of the other screen characteristics, such as gain, resolution or speckle. Ideally, any measures taken to reduce speckle should affect the other screen characteristics as little as possible.

Therefore, there is a need to reduce speckle in rear projection screens while substantially maintaining the other screen characteristics, and without significantly affecting the overall cost or complexity of the screen assembly.

SUMMARY OF THE INVENTION

Generally, the present invention relates to a rear projection screen having one or more internal layers that reduce the speckle perceived by a viewer. One particular embodiment of the invention is a screen assembly having a light-source side and a viewing side. The assembly includes a screen layer to disperse light passing through the screen from the light source side and a matte surface disposed on the viewing side of the screen assembly to reduce ambient glare. A first speckle contrast reducing layer is disposed between the screen layer and the matte surface to reduce speckle formed at the matte surface.

Another particular embodiment of the invention is a screen assembly having a light input side and a viewing side. The screen assembly includes screen dispersing means for dispersing light propagating from the light input side of the screen assembly and glare reducing means on the output side of the screen assembly for reducing ambient glare on the output side of the screen assembly. First speckle reducing means are disposed between the screen dispersing means and the glare reducing means to reduce speckle formed at the glare reducing means.

Another particular embodiment of the invention is a projection system that includes a projection screen assembly having an input side and an output side. The projection screen assembly includes a screen layer to disperse light propagating through the screen assembly from the input side, a matte surface on the output side and a speckle contrast reducing layer disposed between the screen layer and the matte surface to reduce speckle at the matte surface. A light image source projects an image of light on to the input side of the screen assembly.

Another embodiment of the invention is a screen assembly, having a light-source side and a viewing side. The screen assembly includes an image-forming screen layer to disperse light passing through the screen from the light source side and a matte surface disposed on the viewing side of the screen assembly to reduce ambient glare. A first coherence reducing layer is disposed between the screen layer and the matte surface to reduce coherence of light passing from the screen layer to the matte surface.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
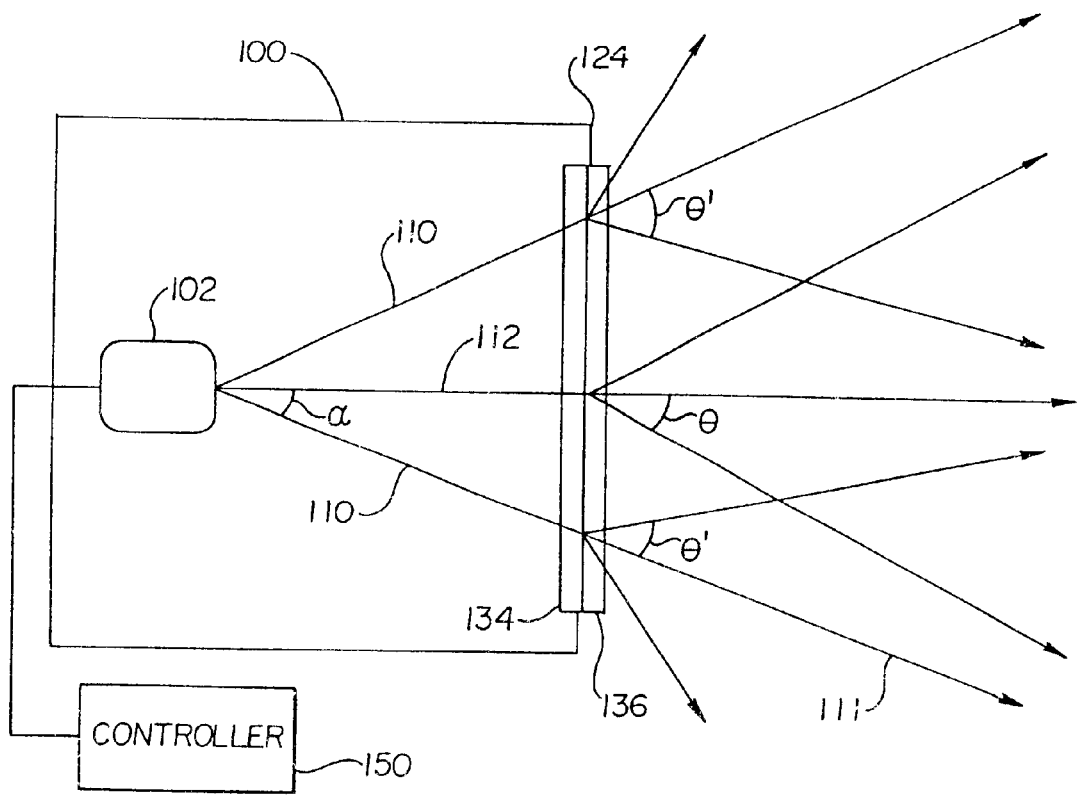
FIG. 1 illustrates a rear projection system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to rear projection screens and is believed to be particularly useful for reducing speckle in the image viewed by a user. One of the advantages of the invention is that the interdependence of the optical properties of the various components of the screen assembly is reduced, thus permitting a selected film characteristic to be optimized without adversely affecting the other characteristics.

The present invention is generally applicable to a number of different screen assemblies and is particularly suited to screen assemblies used in rear projection systems. In particular, the present invention provides advantages in reducing speckle in the image seen by the viewer.

A rear projection display 100 is described with reference to FIG. 1. The display 100 includes an image projector 102 that projects an image onto the rear side of a screen assembly 124. The image is transmitted by the screen assembly 124 so that a viewer, located at some point beyond the screen assembly 124, can see the image projected through the screen assembly 124.

The rear projection display 100 may be, for example, a rear projection television, or a rear projection computer monitor. The image projector 102 may be, for example, a liquid crystal display (LCD) based image projector 102. The image projector 102 may be any other rear projection displaying apparatus, such as ILA® projection technology available from Hughes-JVC Corporation, DLP® digital light processing projection system available from Texas Instruments, and Scanned Linear Grating Light Valve® available from Silicon Light Machines.

The rear projection display 100 may vary in size from relatively small data monitors, to large screen televisions and video walls. The projection display 100 may also rely on a folded image projection path within its housing, such as the various projection systems described in European Patent Application EP783133, entitled "Projecting Images", the contents of which are incorporated herein by reference. As will be appreciated from the descriptions below, such systems particularly benefit from the use of the various screen assemblies described herein below.

Referring again to FIG. 1, the image light 110 and 112 produced by the image projector 102 is directed to the screen assembly 124. The screen assembly 124 typically includes several different layers for controlling the image seen by the viewer, including a dispersing layer 134, or layers, and a rigid plate 136 to provide support. The dispersing layer 134, also referred to as a screen, disperses light passing through a particular point of the screen into a cone angle, so that a viewer on the far side of the screen assembly can detect image light from that particular point. It will be appreciated that the dispersing layer 134 typically disperses light from all points across the screen assembly 124 so that the viewer can see the entire image projected onto the screen assembly 124 by the image projector 102.

The on-axis ray of light 112 is dispersed by the dispersing layer 134 to produce a viewing angle of 2θ. The off-axis light rays 110 from the image projector 102 illuminate the edge of the screen assembly 124, and are separated from the on-axis ray 112 by an angle of α. When the off-axis rays 110 pass through the dispersing layer, they are dispersed by ±θ' about a ray 111 that is at an angle α relative to a screen normal. It should be appreciated that θ' may not be the same as θ, since the amount of dispersion imparted to the light by the light dispersing layer 134 may depend on the angle of incidence of light from the image light source 102. A Fresnel lens (not shown) may be positioned at the input to the screen assembly 124 so as to collimate, or at least reduce the divergence of, the light incident on the light dispersing layer 134.

A controller 150 may be coupled to the image light source 102 to control the image projected by the image light source 102. For example, if the rear projection display 100 is used in a television, the controller may include control electronics to receive the television signal and to produce the image control signal to control the image displayed. Where the rear projection display is used as a computer monitor, the controller may include the computer itself.

A more detailed description of various characteristics of screen assemblies, and their interdependence, is now provided. One important characteristic is gain. The gain represents the screen assembly's brightness as a function of viewing angle. The gain is typically calibrated using an ideal Lambertian reflector with the gain of the ideal Lambertian standard set at 1 for all angles. The peak gain corresponds to the highest gain at some angle. For example, when illuminated from behind at normal incidence, the peak gain of a bulk diffuser screen is typically observed for the light transmitted through the screen at an angle normal to the screen surface.

Another important characteristic is viewing angle. The viewing angle, as used herein, is the angle at which the gain drops to one half of the peak gain. In many situations, the viewing angle corresponds to the angle at which the intensity of the transmitted image drops to half of the intensity of light transmitted normal to the screen surface.

The particular application of the rear projection system determines the desired viewing angle. It is typically advantageous to direct as much light as possible from the screen to the region where the viewer is most likely to be situated. For example, where the display is a data monitor, the viewer is typically positioned centrally relative to, and within approximately one to three feet from, the screen assembly. Another application for a rear projection screen is in a home television system, where it is generally desired to project the image from the screen horizontally over a large angle since it is common for viewers to be seated at a position other than directly in front of the television screen. On the other hand, few viewers view the television screen from a position significantly above or below the screen, and therefore it is commonly desired to reduce the vertical angle over which the image is transmitted. Various approaches have been suggested for preferentially dispersing light in the horizontal direction, including the use of lenticular lens arrays, or two-dimensional arrangements of lenses, such as described in U.S. patent application Ser. No. 09/335,995, incorporated herein by reference.

Another important characteristic is contrast. Generally, contrast is the ratio of luminance of a projected white image to that of a projected black image. As such, numerical contrast numbers are dependent on the light source and the imaging optics. The contrast ratio tends to increase with increasing screen brightness and as the projected black image is made blacker. Contrast may be measured in terms of the dynamic range of the system. The dynamic range is a measure of the contrast ratio in the absence of ambient light.

When a projection display is used in the presence of ambient light, some of the ambient light may be reflected from the screen assembly. This reflected light typically includes specular and diffuse components, and tends to decrease the contrast. Thus, if the screen assembly is used in the presence of ambient light, the contrast ratio is also dependent upon the ability of the screen assembly to prevent reflection of the ambient light. Therefore, the amount of ambient reflectance provides another useful measure of screen performance. Specular reflection of ambient light is commonly reduced by using an anti-reflection (AR) coating on the output surface of the screen assembly, by a matte finish, or by a combination of the two. However, AR coatings typically have limited bandwidth, are effective over a limited angle of incidence, and are expensive to produce. Therefore, a matte screen surface is often preferred to an AR layer for reducing ambient glare.

Another important characteristic, resolution, is becoming increasingly important as rear projection displays are used in applications with higher resolution requirements, for example in high definition television. The resolution afforded by a screen assembly is generally defined as a measure of the finest detail that can be distinguished in an image projected on the screen assembly. One method of measuring resolution is accomplished by projecting an image that represents a series of sets of dark and bright lines at progressively smaller spacing in order to ascertain the limiting number of lines per millimeter that can be resolved. Using this method, the resolution can be quantified as the ability to resolve horizontal and/or vertical bars at different spatial frequencies.

Figure 2A:
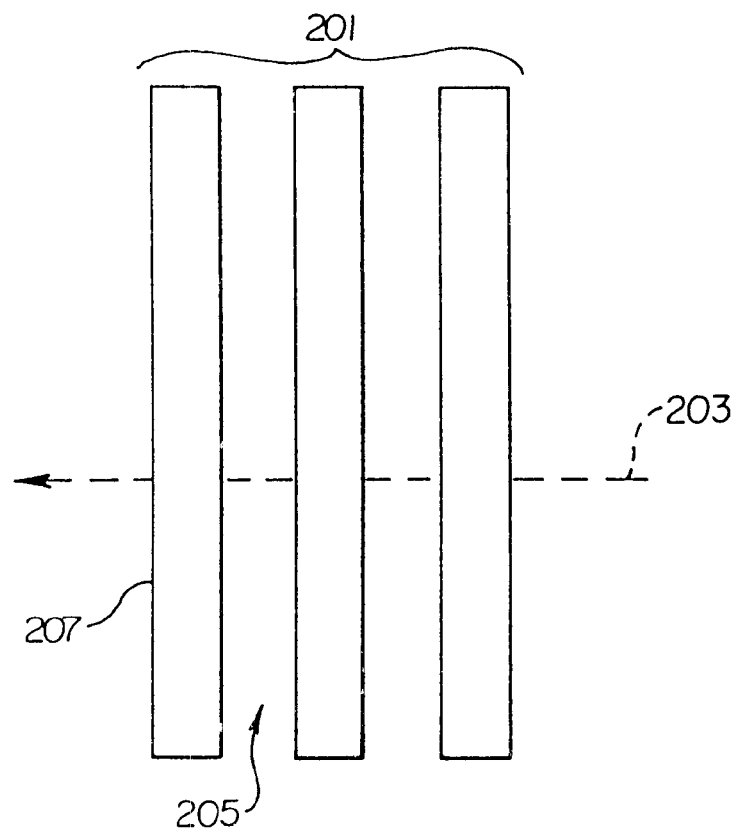
FIG. 2A illustrates a line pattern used for measurement of screen resolution.
Figure 2B:
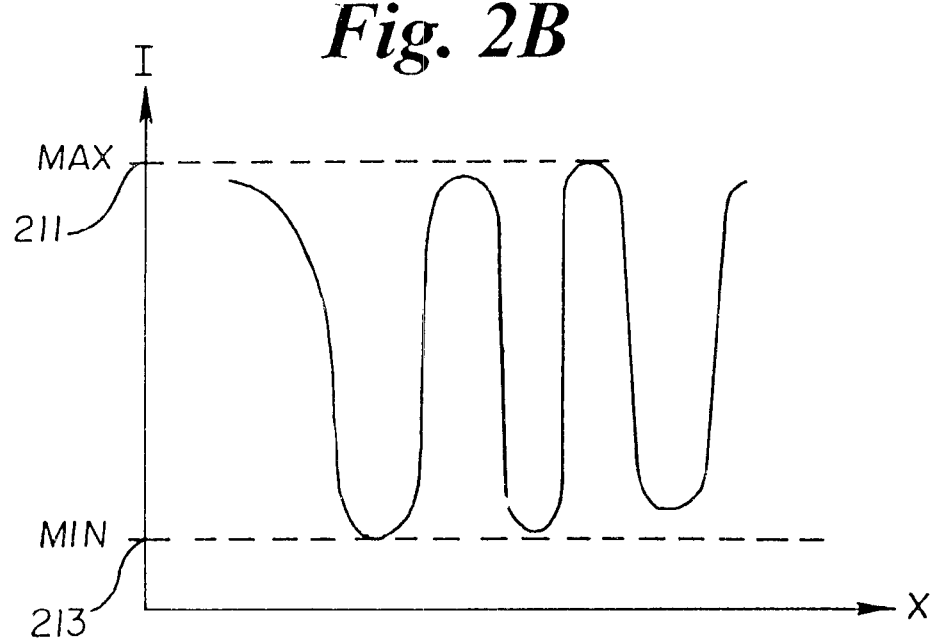
FIG. 2B illustrates exemplary results of an intensity measurement used in determining screen resolution.

Resolution can be quantified by measuring the modulation depth (MD) depth in the manner depicted in FIGS. 2A and 2B. As illustrated in FIG. 2A, the modulation depth is measured by examining a pattern 201 of repeating bright 205 and dark 207 images, having a specified spatial frequency, transmitted through the screen. The pattern 201 is scanned along a line 203 orthogonal to the bars. The scan measures the intensity of light as a function of position along the scan line 203. The results of such a scan can be graphically represented by plotting the intensity as a function of position along the scan line 203 as illustrated in FIG. 2B.

The scanned intensities can be used to calculate an intercharacter contrast (ICC) value. ICC is the ratio of intensities according to the relationship:

$$ICC = I_{max}/I_{min},$$

where $I_{max}$ is the maximum intensity 211 of the scan and $I_{min}$ is the minimum intensity 213 of the scan.

The modulation depth of the screen is calculated from the ICC according to the relationship:

$$MD = \frac{ICC - 1}{ICC + 1},$$

Which represents a normalized value. As will be appreciated, the modulation depth of any measured element lies between 0 and 1, with 1 being perfect resolution and 0 being an unresolvable image. It will generally be appreciated that a higher value of ICC leads to a higher modulation depth.

The modulation depth provides a particularly useful measure for determining the performance of a screen assembly and for comparing the relative performance of different combinations of screens and other screen elements. Under high levels of ambient light, both $I_{max}$ and $I_{min}$ are typically offset by the same amount. Consequently, the ICC is reduced, thus reducing the modulation depth. Therefore, the reduction of ambient light reflection is important for not only preserving high contrast, but also for preserving high resolution.

Another important screen characteristic is the ability of the screen assembly to reproduce the image with minimal, if any, color and speckle effects. In certain screen assemblies, color may be observed as a random pattern of differently colored, pixel-like spots on the screen. Such color artifacts typically result from wavelength-dependent effects, for example scattering, in which different wavelengths are scattered in different directions or with different efficiency. As a result of wavelength-dependent effects, different colors may become physically separated and observable by the viewer. In a screen assembly that uses a bulk diffuser as the screen, the thickness of the bulk diffuser may be increased until the observer can no longer resolve any color separation, thus reducing color artifacts. The loading of diffusing particles in the bulk diffuser may be adjusted to provide the desired gain and viewing angle.

Figure 3:
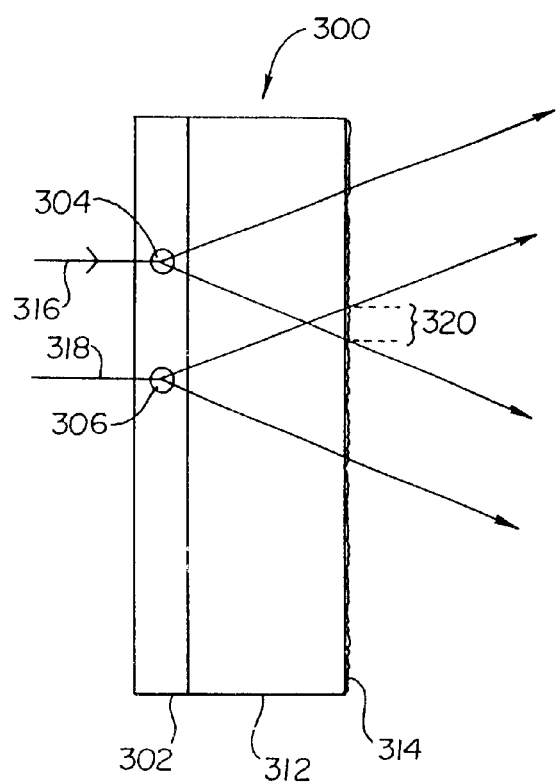
FIG. 3 illustrates a screen assembly.

Speckle may be understood with reference to FIG. 3, which illustrates a rear projection screen assembly 300. The screen assembly 300 has a dispersing layer 302, or screen layer, that disperses the light into a viewing cone having a viewing angle. The dispersing layer 302 may be a bulk diffuser layer or may be a refractively dispersing layer, such as a lenticular lens sheet, a beaded lens sheet or a lenslet array sheet. The dispersing layer 302 may be supported on a substrate 312. The output surface of the substrate 312 may be provided with a matte surface 314 to reduce glare.

Speckle arises from spatial coherence in the light 308 incident on the dispersing layer 302. After traversing the dispersing layer 302, light that has passed one region 304 of the screen diverges and spatially overlaps light that has passed through another region 306. An interference pattern is formed in the volume of overlap when the light passing through the neighboring region 304 and 306 is mutually coherent. A subsequent diffusing surface, such as the matte surface 314, acts as a screen to display this interference pattern. Points of constructive interference appear brighter, while points of destructive interference appear darker, thus resulting in the viewer seeing speckle. For example, rays 316 and 318 pass through neighboring regions 304 and 306 and cross at the matte surface 314 at region 320. If rays 316 and 318 are mutually coherent, then interference may occur at region 320, producing speckle.

Speckle also arises using other types of screen layers, including bulk diffusers and lenticular dispersing layers. Speckle is typically quantified by calculating the speckle contrast, which is defined as the standard deviation of the brightness measured across the screen divided by the average screen brightness. Thus, a given deviation in screen brightness measured in absolute terms produces a higher speckle contrast when the average screen brightness is low.

Speckle is becoming an increasing problem for display screens. Advanced light projector devices are becoming smaller, for example the liquid crystal display units used for projection displays are becoming smaller in order to increase the throughput of the light from the light source. It is known that light coming from a projection lens with a finite pupil diameter is partially coherent, with the coherence length being dependent on the diameter of the projection lens. Everything else being equal, the smaller the lens diameter, the longer the coherence length. Accordingly, the coherence length of the light reaching a screen in an advanced display is longer, thus increasing the appearance of speckle.

Figure 4:
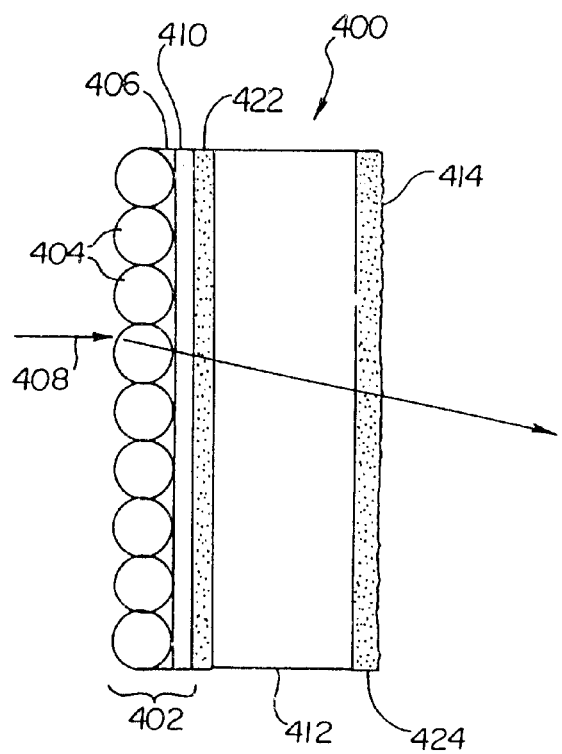
FIG. 4 illustrates one embodiment of a screen assembly in accordance with the present invention.

Diffusing layers may be positioned after the dispersing layer to the coherence length of the light, and therefore reduce the effect of speckle, as shown in the following embodiments. One particular embodiment of the present invention is illustrated in FIG. 4. A rear projection screen assembly 400 includes a screen layer 402. In this embodiment, the screen layer 402 includes a layer of transparent beads 404 embedded in an absorbing layer 406, as disclosed, for example in U.S. Pat. No. 2,378,252 and U.S. patent application Ser. No. 09/192,118, each of which is incorporated by reference. The beads 404 are typically in intimate contact, or close to intimate contact, with a transparent binder layer 410.

Light 408 entering a bead 404 from the image projector is refracted through the bead, and passes into the binder layer 410 either without passing through the absorbing material 406, or passing through only a thin layer of the absorbing material 406. Light that passes through a significant thickness of absorbing material is absorbed and not transmitted to the binder layer 410. The light entering the binder layer 410 is transmitted to a thicker supporting substrate 412, for example a sheet of glass, acrylic, polycarbonate or other suitable supporting material. The dispersing layer 402 includes the beads 404, the absorbing layer 406 and the clear binder layer 410. The dispersing layer 402 is typically laminated to the supporting substrate 412, or attached using an adhesive layer. The input surfaces of the beads 404 may be provided with an anti-reflection coating to reduce reflective losses.

The exit surface of the supporting substrate 412 may include a matte surface 414 to reduce ambient glare. The degree of diffusion imparted by the matte surface 414 to light passing therethrough is ideally just enough to reduce the glare to an acceptable level. A higher degree of diffusion results in an unnecessary loss of resolution and contrast without providing any further advantages. The matte surface 414 may be formed by embossing and/or coating.

A first diffuser layer 422 is juxtaposed with the screen layer 402. The first diffuser layer 422 may be a bulk diffuser layer. The first diffuser layer 422 may be an optical adhesive, The bulk diffuser layer 422 may be applied to the dispersing layer 402 by lamination, coating, extrusion, or any other suitable process. The first diffuser layer 422 is sandwiched between the dispersing layer 402 and the substrate 412.

A second diffuser layer 424 may also be included on the viewing side of the supporting substrate 412 with the matte surface 414 disposed on the viewing side of the second diffuser layer 424. If the second diffuser layer 424 is not included, then the matte surface 414 may be provided on the viewing surface of the supporting substrate 412.

The first and second diffusing layers 422 and 424 reduce the speckle produced at the matte surface 414. The amount of diffusion for the first and second diffuser layers 422 and 424 may be selected by controlling the loading of the diffusing particles included in the diffusing layers 422 and 424, the thickness of each diffusing layer 422 and 424, and the distance separating the diffusion layers 422 and 424 from the dispersing layer 402. This approach permits the reduction of speckle to acceptable levels while substantially maintaining resolution, gain and contrast at optimal levels. The screen assembly 400 may also be provided without one of the diffusing layers 422 and 424.

In the particular embodiment illustrated, the beads 404 are shown to all have the same diameter. In such a case the beads are said to be monodispersed. In a practical beaded screen, the beads may not all be of the same diameter, and may be referred to as being non-monodispersed. It will be appreciated that the speckle effect is greater for monodispersed beads than non-monodispersed beads, since the focal lengths of the non-monodispersed beads are different.

A diffusing layer positioned before the screen layer may be used to reduce the coherence length, and therefore reduce the speckle. However, this arrangement leads to reduced gain and less throughput, particularly where the dispersing screen has a limited acceptance angle. For example, in the case of a beaded screen layer, diffused light may enter the beads 404 in such a direction as to pass into a thick portion of the absorbing layer 406. A diffusing layer placed before the dispersing layer may also reduce resolution. For example, light that would otherwise have passed into one bead 304 may be diffused into another bead 304.

Figure 5:
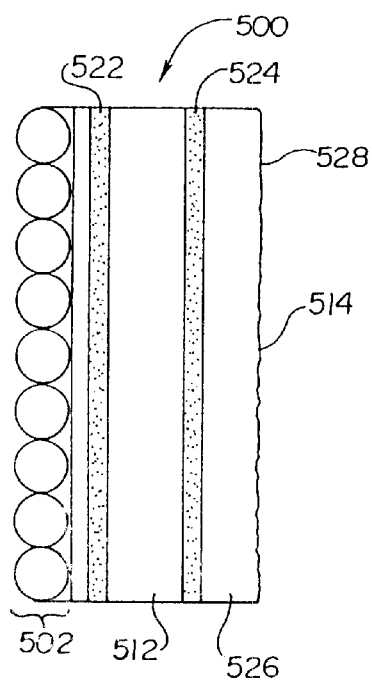
FIG. 5 illustrates another embodiment of a screen assembly in accordance with the present invention.

Another particular embodiment of the present invention is illustrated in FIG. 5. A screen assembly 500 includes a screen layer 502 combined with a first diffusion layer 522. The first diffusion layer 522 may be combined with the screen layer 502 by lamination, coating, extrusion, or some other suitable process for combining the layers.

A second diffusing layer 524 is attached on one side to a first substrate 512 and on another side to a second substrate 526. The first and second substrates 512 and 526 may be transparent supporting substrates. The viewing surface 528 of the second substrate 526 may include a matte surface 514 for reducing ambient glare. The first and second substrates 512 and 526, and the second diffusing layer 524 may be formed from separate layers which are subsequently laminated, or otherwise adhered, may be formed by coating one layer over another, or may be formed by co-extrusion. The matte surface 514 may be embossed or coated on the viewing surface 528 of the second substrate 526.

The first diffusing layer 522 may be laminated or otherwise adhered to the first substrate 512, coated on the first substrate 512 or vice versa, or may be co-extruded with the first substrate 512.

In this embodiment, there are three diffusing regions following the screen layer 502, namely the first and second diffusing layers 522 and 524 and the matte surface 514. The first and second diffusing layers 522 and 524 reduce the speckle produced on the matte surface 514.

Figure 6:
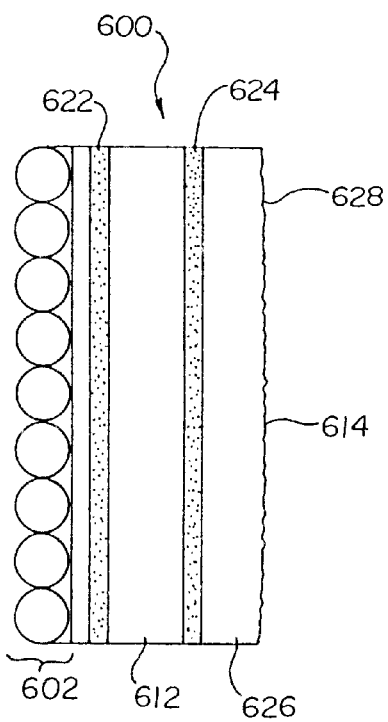
FIG. 6 illustrates another embodiment of a screen assembly in accordance with the present invention.

Another particular embodiment of the present invention is illustrated in FIG. 6. A screen assembly 600 includes a screen layer 602 combined with a first substrate layer 612. The screen layer 602 may be laminated on the first substrate layer 612, or may be attached using an adhesive layer 622. The adhesive layer 622 may include optical adhesive or other bonding agent. The adhesive layer 622 need not be a diffusing layer.

A first diffusing layer 624 is attached on one side to the first substrate layer 612. The first diffusing layer may be attached on another side to a second substrate layer 626. The first and second substrate layers 612 and 626 may be transparent supporting substrates. The viewing surface 628 of the second substrate layer 626 may include a matte surface 614 for reducing ambient glare. The first and second substrate layers 612 and 626, and the first diffusing layer 624 may be formed from separate layers which are subsequently laminated, or otherwise adhered, may be formed by coating one layer over another, or may be formed by co-extrusion. The matte surface 614 may be embossed or coated on the viewing surface 628 of the second substrate layer 626.

In this embodiment, there are two diffusing regions following the dispersing layer 602, namely the first diffusing layer 624 and the matte surface 614. The first diffusing layer 624 reduces speckle formed at the matte surface 614. One or other of the substrate layers 612 and 626 may be omitted. Where the second substrate layer 626 is omitted, the matte surface 614 may be provided on the viewing side of the diffusing layer.

Figure 7:
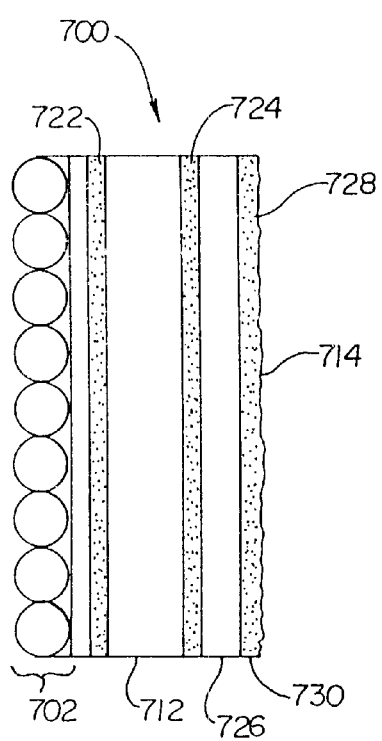
FIG. 7 illustrates another embodiment of a screen assembly in accordance with the present invention.

Another particular embodiment of the present invention is illustrated in FIG. 7. A screen assembly 700 includes a screen layer 702 combined with a first substrate layer 712. The screen layer 702 may be laminated on the first substrate layer 712, or may be attached using an adhesive layer 722. The adhesive layer 722 may include optical adhesive or other bonding agent. The adhesive layer 722 need not be a diffusing layer.

A first diffusing layer 724 is attached on one side to the first substrate layer 712 and on another side to a second substrate layer 726. The first and second substrate layers 712 and 726 may be transparent supporting substrates. A second diffusing layer 730 is attached on the viewing side of the second substrate layer 726. The viewing surface 728 of the second diffusing layer 730 may include a matte surface 714 for reducing ambient glare. The first and second substrate layers 712 and 726, and the first and second diffusing layers 724 and 730 may be formed from separate layers which are subsequently laminated, or otherwise adhered, may be formed by coating one layer over another, or may be formed by co-extrusion. The matte surface 714 may be embossed or coated on the viewing surface 728 of the second diffusing layer 726.

In this embodiment, there are three diffusing regions following the dispersing layer 702, namely the first and second diffusing layers 724 and 730, and the matte surface 714. The first and second diffusing layers 724 and 730 reduce the speckle formed at the matte surface 714.

Figure 8:
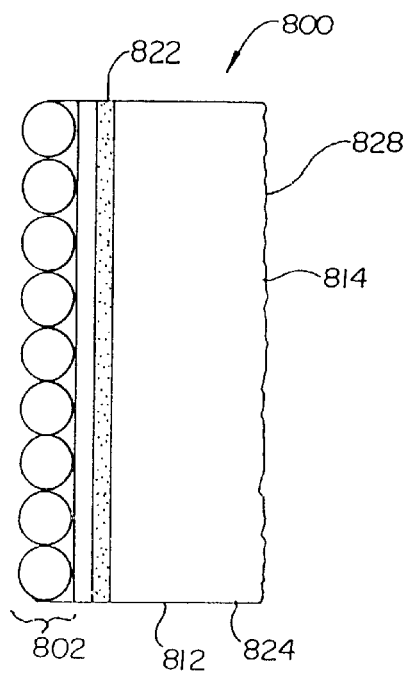
FIG. 8 illustrates another embodiment of a screen assembly in accordance with the present invention.

Another particular embodiment of the present invention is illustrated in FIG. 8. A screen assembly 800 includes a screen layer 802 combined with a first substrate layer 812. The screen layer 802 may be laminated on the first substrate layer 812, or may be attached using an adhesive layer 822. The adhesive layer 822 may include optical adhesive or other bonding agent. The adhesive layer 822 need not be a diffusing layer.

The first substrate layer 812 is also a diffusing layer, having a plurality of scattering particles 824 disposed throughout its volume, the scattering particles 824 having a refractive index different from the bulk of the substrate layer 812. The viewing surface 828 of the substrate layer 812 includes a matte surface 814 for reducing ambient glare.

In this embodiment, there are two diffusing regions following the dispersing layer 802, namely the substrate layer 812 and the matte surface 814. The substrate layer 812 reduces the speckle formed at the matte surface 814.

Different types of screen layer may be used in the present invention. The beaded screen layer illustrated above is an image-forming screen layer in that the light passing through a bead forms an image, in this case a real image. Other types of image forming screen layer, that use other image-forming dispersing elements, may be used including covered, beaded screen layers, lenticular screen layers, and lenslet array screen layers.

The speckle reducing effect of the diffusing layer may be reduced if the diffusing layer is positioned close to the focus of light passing through a dispersing element, such as a bead, a lenticular lens or a lenslet. Furthermore, it may be difficult to place the diffusing layer between the screen layer and the focus of light if the focal length of the light dispersing element is short. Accordingly, the speckle-reducing diffusing layer may advantageously be spaced apart from an image-forming screen layer by a distance greater than the distance between the image-forming screen layer and the image surface. The image surface is a surface that includes the images formed by the image-forming elements of the dispersing layer.

Figure 9:
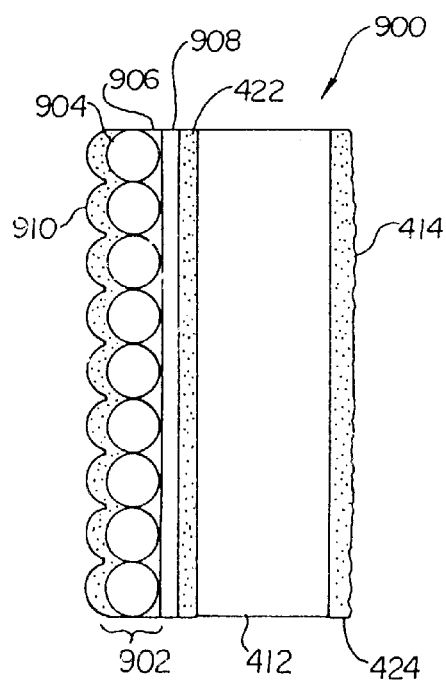
FIG. 9 illustrates another embodiment of a screen assembly in accordance with the present invention.

Another particular embodiment of the present invention is illustrated in FIG. 9, showing a screen assembly 900 that is similar to the embodiment illustrated in FIG. 4 except for the screen layer. In this embodiment, the screen layer 902 is combined with a first diffusing layer 422, a substrate layer 412 and a second diffusing layer 424. The outside surface of the second diffusing layer 424 is a matte surface 414. The screen layer 902 includes an arrangement of transparent beads 904 embedded in an absorbing layer 906. The beads 904 are in intimate contact, or close to intimate contact, with a transparent binder layer 908. A refractive layer 910 overlies the beads 904 on the light source side of the screen assembly 900 in order to control the optical performance of the beads, for example as is described in U.S. Pat. No. 5,563,738 and U.S. patent application Ser. No. 09/192,118. This type of covered, beaded screen layer may 902 be used with any of the embodiments of the invention presented above. In this embodiment, the first and second diffusing layers 422 and 424 reduce the speckle produced at the matte surface 914.

Figure 10:
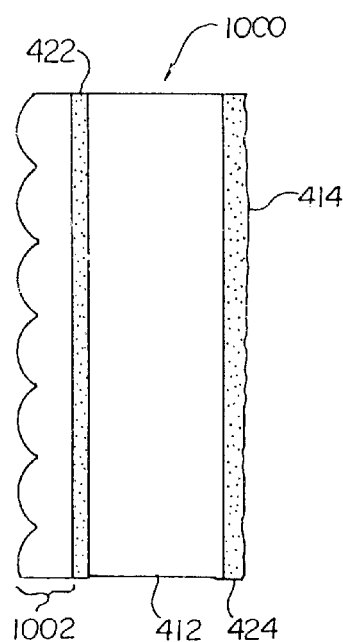
FIG. 10 illustrates another embodiment of a screen assembly in accordance with the present invention.

Another embodiment is illustrated in FIG. 10, showing a screen assembly 1000 that is similar to the embodiment illustrated in FIG. 4 except for the screen layer. In this embodiment, the screen layer 1002 is a lenticular lens arrangement combined with a first diffusing layer 422, a supporting substrate layer 412 and a second diffusing layer 424. The viewing side of the second diffusing layer 424 may be provided with a matte surface 414 to reduce ambient glare. The first and second diffusing layers 422 and 424 reduce speckle formed at the matte surface 414.

The screen layer may be any other type of dispersing layer that disperses light in the horizontal and vertical directions. For example, the dispersing layer 1002 may be a two-dimensional arrangement of lenslets, as described in U.S. patent application Ser. No. 09/335,995, incorporated herein by reference. Different types of screen layers may be used with other screen assemblies such as the embodiments described herein.

There is an increased need for a speckle reducing diffuser layer when the image plane formed by the screen is thinner. Where the screen layer is a beaded screen, for example as illustrated in FIG. 4, the image plane is the plane formed by the foci of light passing through each bead. Each of the other types of screen disclosed above have an associated image plane. The image planes of screens that use refractive surfaces for dispersing the image light, such as beaded screen layers and lenticular screen layers, tend to be thin, and so such screens tend to require the use of a speckle reducing layer to reduce speckle to acceptable levels.

Screens formed from bulk diffuser material, formed from scattering particles disposed within a continuous matrix, also give rise to speckle. Bulk diffuser screens, therefore, also benefit from the addition of a speckle reducing layer.

The image plane of a bulk diffuser is considered to be the thickness of the diffuser. Therefore, a bulk diffuser of a specific thickness produces less speckle than a thinner bulk diffuser screen that produces the same optical gain and viewing angle due to a higher particle loading. Speckle may be reduced by increasing the separation between scattering centers in a screen or as part of the optical train.

Figure 11:
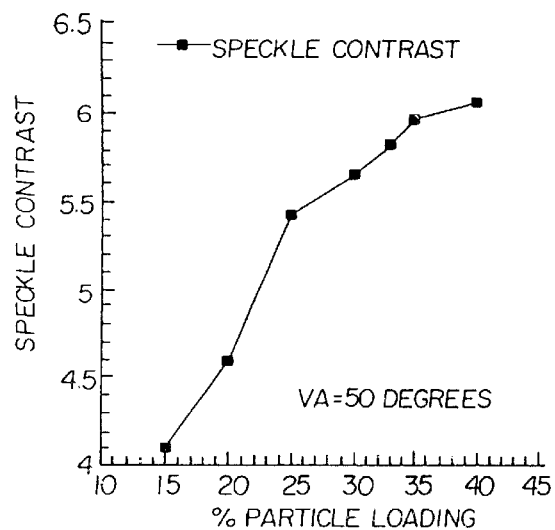
FIG. 11 illustrates a graph of speckle contrast plotted against particle loading in a bulk diffuser.

For a given viewing angle and peak gain, speckle can be reduced by reducing the particle loading, the fraction of the bulk diffuser constituted by the scattering particles. To maintain a constant peak gain and viewing angle, the diffuser thickness is increased as the particle loading is decreased. As an example, samples of bulk diffuser using an acrylate matrix were prepared with different particle loadings to have a viewing angle of 50°. The particles were formed from a mixture of polystyrene and polymethyl methacrylate (PMMA), had an average diameter of about 5 $\mu$m, and had a refractive index of 1.54. The refractive index of the matrix was 1.475. FIG. 11 illustrates the speckle contrast measured for each sample, plotted as a function of particle loading. The speckle contrast reduces with reduced particle loading. Thus, the speckle contrast falls with increased film thickness while the viewing angle and gain stay constant. The speckle contrast was measured using the technique described below.

Figure 12A:
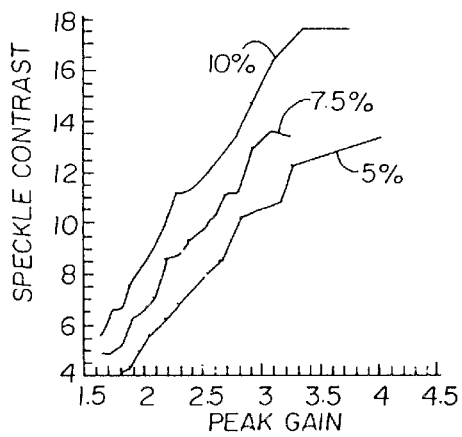
FIGS. 12A and 12B illustrate graphs of speckle contrast plotted against peak gain for bulk diffusers having different levels of particle loading.
Figure 12B:
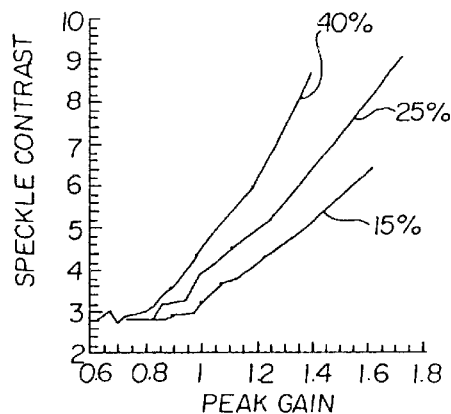

The dependence of speckle contrast on diffuser thickness is further illustrated in FIGS. 12A and 12B. The graph illustrated in FIG. 12A shows speckle contrast plotted for three different values of particle loading, 5%, 7.5% and 10%. The speckle contrast is plotted against peak gain. It should be understood that the peak gain of a bulk diffuser screen reduces as the screen thickness is increased. Also, for a given particle loading, the viewing angle increases with increased thickness. The graph shows that the speckle contrast falls with the peak gain. Thus, the speckle contrast falls as the film thickness and viewing angle increase. FIG. 12B illustrates a similar relationship, for particle loadings of 15%, 25% and 40%.

Figure 13:
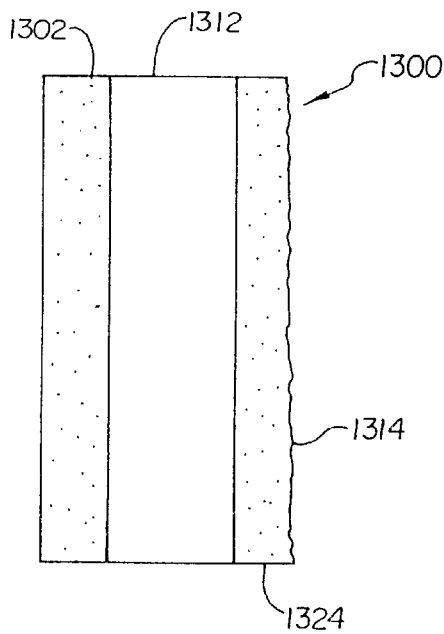
FIG. 13 illustrates another embodiment of a screen assembly in accordance with the present invention.

Although the particle loading and thickness of a bulk diffuser screen may be tailored to reduce speckle to some degree, there may still remain certain situations, for example where a screen assembly is required to have a low speckle contrast, where it is advantageous for the bulk diffuser screen assembly to include a speckle reducing layer. One embodiment of such a screen assembly 1300 is illustrated in FIG. 13. The screen assembly 1300 includes a bulk diffuser screen 1302 is attached to one side of a substrate layer 1312. A speckle-reducing diffuser layer 1324 is attached to the other side to the substrate layer 1312. The layers may be attached by lamination, adhesion, co-extrusion or any other suitable method. There is matte surface 1314 on the output surface of the speckle-reducing diffuser layer 1324 to reduce ambient glare.

It will be appreciated that many combinations of screen layer and different arrangements of diffusing regions following the screen layer may be used.

EXAMPLES

A number of examples of the present invention have been constructed and tested. Results are summarized below. The gain, viewing angle and modulation depth were measured using known techniques. The method used for measuring the speckle contrast is described below.

Example 1

Figure 14:
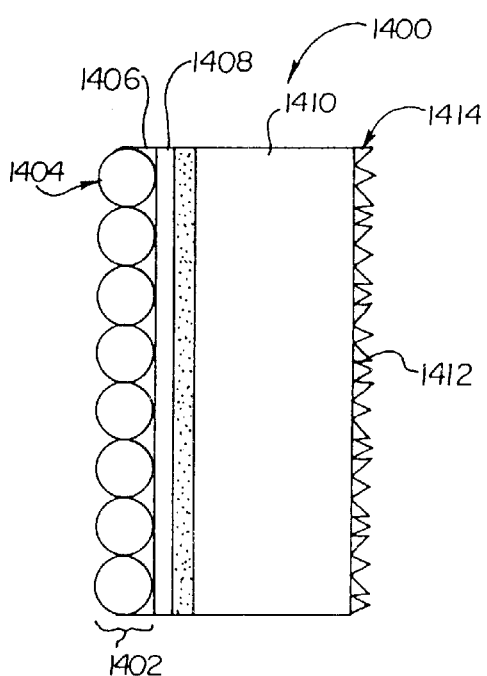
FIG. 14 schematically illustrates the construction of the screen assembly in Example 1.

A screen assembly 1400 was constructed as illustrated in FIG. 14. The dispersing layer 1402 was formed from an arrangement of glass beads 1404 having a mean diameter of approximately 60 $\mu$m, embedded in an absorbing layer 1406 that was attached to a binder layer 1408. The binder layer 1408 was attached to a 3 mm thick acrylic substrate 1410 extruded using varying ratios of Acrylite DF series diffuse acrylic compound and Acrylite H-10, both available from CYRO. The output surface 1412 of the substrate 1410 was embossed to achieve a matte surface 1414.

Eight samples were made in this example, having various concentrations of diffuser. The substrate 1414 of Sample 1, was formed from a mixture of 10% DF21 diffusive acrylic and 90% clear acrylic. Samples 2–6 used other ratios of DF 21 diffusive acrylic and clear acrylic. Sample 7 used 100% DF 22 diffusive acrylic and sample 8 used 100% of DF 23 diffusive acrylic. The substrate diffusivity increased for samples 1 through 8.

Table I shows the measured characteristics of the eight samples. DF Conc. and H-10 Conc. are respectively the concentrations of DF and H-10 acrylics used to form the substrate 1410. PG is the peak gain as defined above. ΔPG is reduction in PG resulting from the introduction of the diffusive substrate 1410. VA is the viewing angle in degrees. SC is the speckle contrast in %, measured using the technique described below. MD is the modulation depth, and was measured for 1.12 line pairs per mm and 1.59 line pairs per mm.

TABLE I

Measured Screen Characteristics for Example 1

| | DF Conc. | H-10 Conc. | PG | ΔPG | VA | SC | MD 1.12 | MD 1.59 |
|---|---|---|---|---|---|---|---|---|
| 1 | 10% DF 21 | 90% | 1.03 | 1.9% | 34.5° | 10.00% | 0.90 | 0.76 |
| 2 | 30% DF21 | 70% | 1.00 | 4.8% | 35.4° | 8.00% | 0.86 | 0.68 |
| 3 | 50% DF 21 | 50% | 0.96 | 8.6% | 36.1° | 5.75% | 0.78 | 0.62 |
| 4 | 70% DF 21 | 30% | 0.96 | 8.6% | 37.0° | 5.50% | 0.75 | 0.58 |
| 5 | 90% DF 21 | 10% | 0.94 | 10.5% | 36.6° | 4.00% | 0.70 | 0.45 |
| 6 | 100% DF 21 | 0% | 0.90 | 14.2% | 36.2° | 3.75% | 0.65 | 0.30 |
| 7 | 100% DF 22 | 0% | 0.80 | 23.5% | 32.7° | 2.75% | 0.30 | 0.10 |
| 8 | 100% DF 23 | 0% | 0.64 | 38.7% | 35.5° | 2.00% | 0.10 | 0.03 |

Figure 15A:
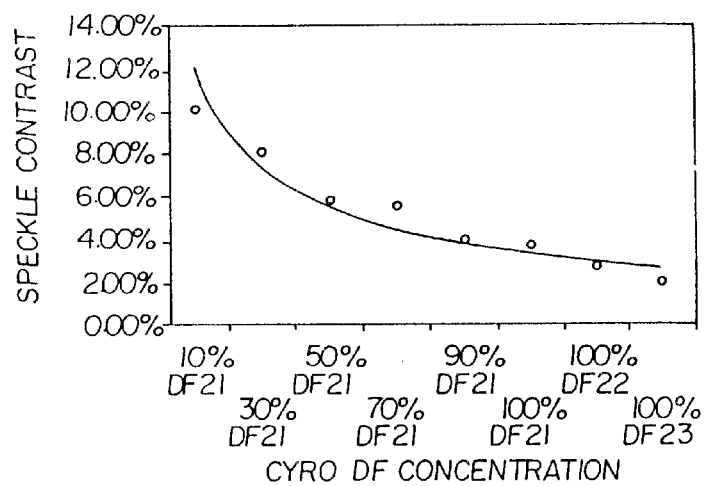
FIGS. 15A and 15B respectively illustrate graphs of speckle contrast and resolution plotted against diffuser type for Example 1.
Figure 15B:
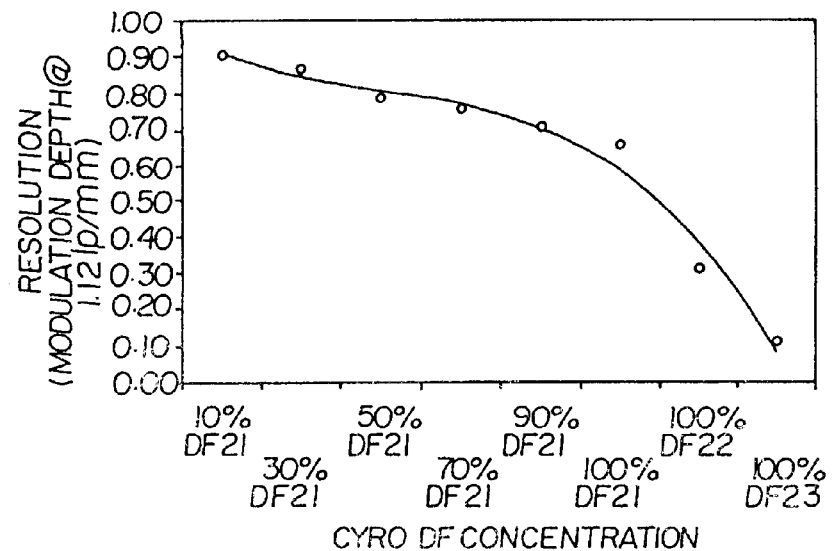

The measured speckle contrast, SC, is shown plotted against DF concentration in FIG. 15A. The resolution at 1.12 line pairs/mm is shown plotted against DF concentration in FIG. 15B. The speckle contrast and resolution both decrease with increasing diffusion in the substrate 1410.

The addition of the diffusive substrate 1410, with midrange diffusivity, significantly reduces in the speckle contrast, without having a significant effect on the peak gain or the viewing angle. For example, Sample 3 has a peak gain that is only reduced by about 4% from the gain without the substrate, and the viewing angle is increased by only about 1.6°. The speckle contrast, on the other hand, is reduced from 10% to 5.5%.

A speckle contrast below about 6% is considered acceptable for HDTV viewing applications, where the viewer is positioned at a distance of at least 2–3 times the diagonal dimension of the screen. For example, for a 1016 mm (40") diagonal screen, it is generally assumed that the viewer is at least 2032 mm (80") away from the screen. Furthermore, a modulation depth of about 50% at 1.12 line pairs/mm is generally considered acceptable for a television screen. Therefore, Samples 3–6 exhibit acceptable levels of speckle contrast and modulation depth for HDTV applications.

Furthermore, it is generally held that rear-projection monitor screens require a maximum speckle contrast of 5% and a minimum modulation depth of 0.7 at 1.12 line pairs/mm. Sample 5 meets these more demanding requirements.

Example 2

Figure 16:
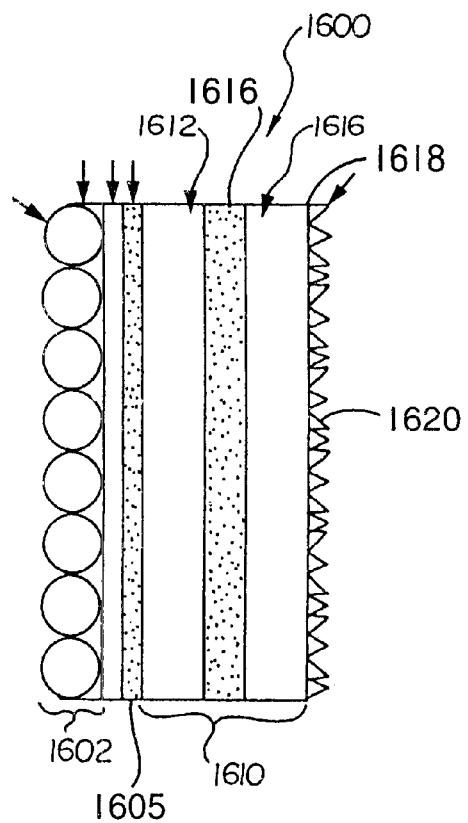
FIG. 16 schematically illustrates the construction of the screen assembly in Example 2.

A screen assembly 1600 was constructed as shown in FIG. 16. The dispersing layer 1602 was similar to the dispersing layer 1602 in Example 1. The dispersing layer 1602 was attached, via an optical adhesive layer 1605, to a compound supporting layer 1610. The compound supporting layer 1610, formed by co-extrusion, was 3 mm thick, and included a 1 mm thick first clear layer 1612, a second clear layer 1616 and a diffusing layer 1614 sandwiched between the two clear layers 1612 and 1616. The combined thickness of the diffusing layer 1614 and the second clear layer 1616 was 2 mm. The diffusing layer 1614 was formed from a mixture of 90 wt% CYRO Acrylite DF 21 diffuse acrylic compound and 10 wt% CYRO Acrylite H10 clear acrylic blend. The output surface 1618 of the second clear layer was embossed with a matte, anti-glare surface 1620.

Six samples were manufactured having different thicknesses for the diffusing layer 1614. The optical properties were measured for each sample and are presented in Table II.

TABLE II

Measured Screen Characteristics for Example 2

| Diff. Layer (mm) | 2nd Clear Layer (mm) | PG | ΔPG | VA | SC | MD 1.12 | MD 1.59 |
|---|---|---|---|---|---|---|---|
| 0.51 | 1.49 | 1.02 | 2.9% | 35.2 | 9.25% | 0.95 | 0.85 |
| 0.66 | 1.34 | 1.01 | 3.8% | 35.8 | 8.75% | 0.93 | 0.80 |
| 0.84 | 1.16 | 1.02 | 2.9% | 35.6 | 8.50% | 0.90 | 0.75 |
| 0.99 | 1.01 | 0.99 | 5.7% | 36.1 | 7.00% | 0.85 | 0.70 |
| 1.35 | 0.65 | 0.99 | 5.7% | 36.2 | 6.25% | 0.82 | 0.68 |
| 1.65 | 0.35 | 0.98 | 6.7% | 36.4 | 5.50% | 0.80 | 0.60 |

Figure 17A:
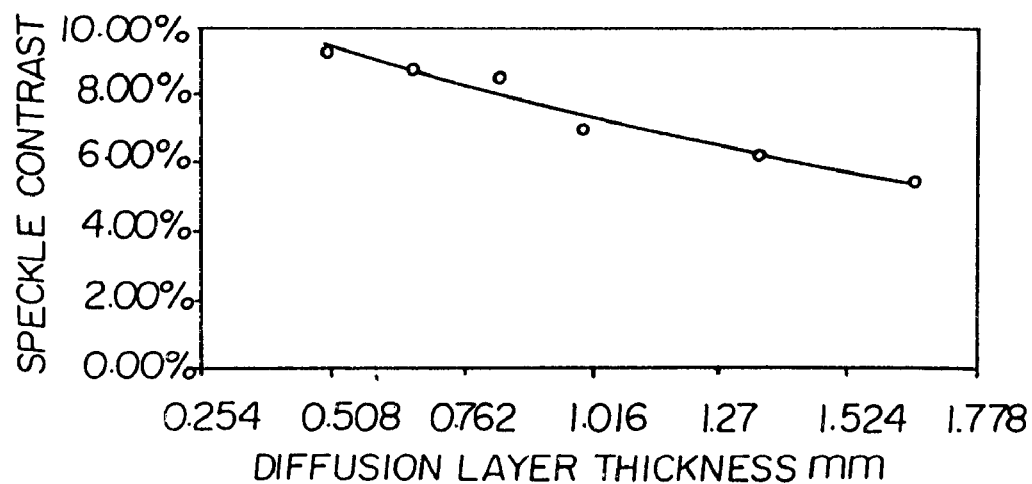
FIGS. 17A and 17B respectively illustrate graphs of speckle contrast and resolution plotted against thickness of the diffuser layer for Example 2.
Figure 17B:
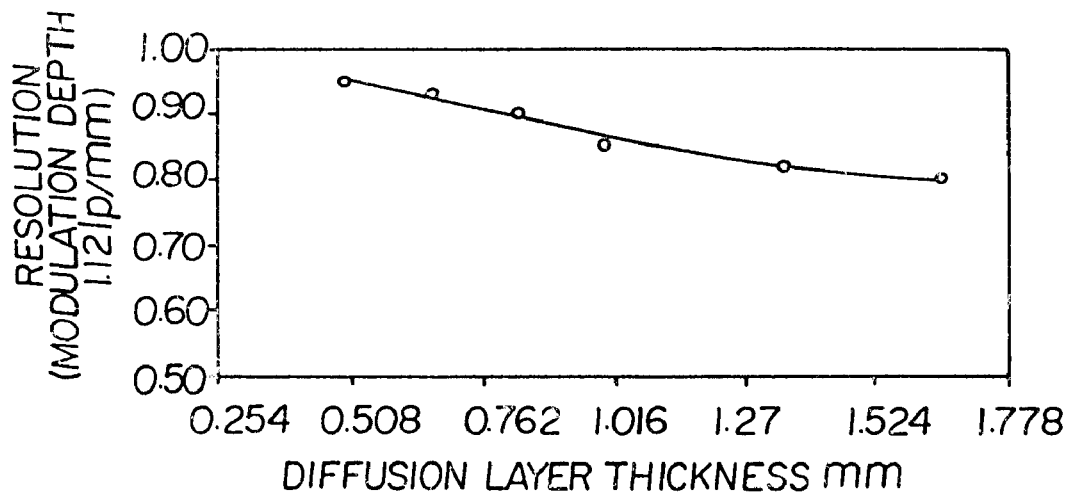

These results show that everything else being equal, the speckle contrast falls as the thickness of the diffuser layer 1614 is increased. The modulation depth, on the other hand, falls as the diffuser becomes thicker. is moved further from the screen. The variations in speckle contrast and modulation depth with diffusion layer thickness are shown plotted in FIGS. 17A and 17B respectively.

Example 3

Figure 18A:
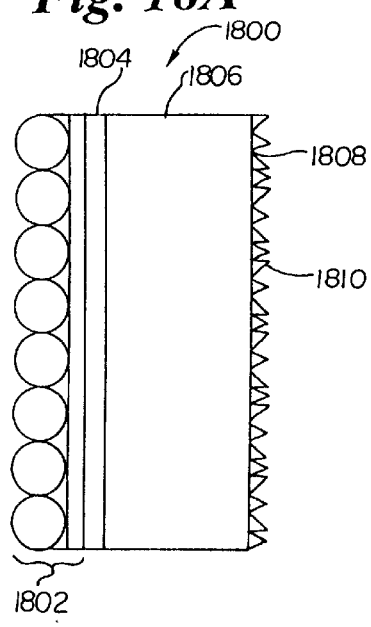
FIGS. 18A and 18B illustrate constructions of samples of the screen assemblies of Example 3.
Figure 18B:
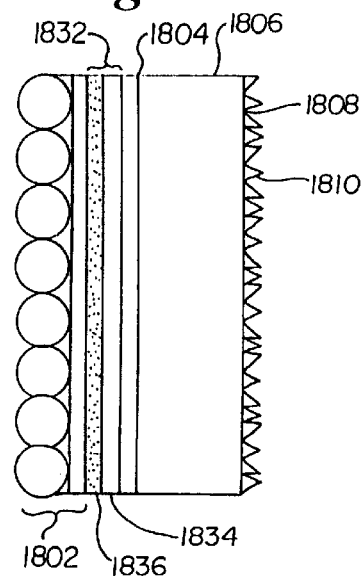

Screen assemblies 1800 and 1830 were constructed as shown in FIGS. 18A and 18B respectively. The assembly 1800 was formed using a dispersing film 1802 similar to that used in assembly 1400. The dispersing film 1802 was attached to 3 mm thick clear acrylic substrate 1806 by a diffusing adhesive layer 1804. The adhesive layer 1804 was an acrylate based, optical adhesive incorporating 5 μm polystyrene beads dispersed at a loading of 15 wt%. The output surface 1808 of the substrate 1806 was embossed to have a matte finish 1810.

Screen assembly 1830 was similar to screen assembly 1800, but also had a spacer 1832, formed from a layer of clear acrylic 1834 and a layer of adhesive 1836 between the dispersing film 1802 and the diffusing layer 1804. The spacer 1832 had a thickness of 0.2 mm (0.008").

Samples of both assemblies 1800 and 1830 were made having different diffusing layer thicknesses. The measured optical characteristics of the screen assemblies 1800 and 1830 are presented in Tables III and IV respectively.

TABLE III

Measured Screen Characteristics for Example 3, Assembly 1800

| Sample | Diff. layer (mm) | PG | ΔPG (%) | VA | SC (%) | MD 1.12 | MD 2.52 |
|---|---|---|---|---|---|---|---|
| 1 | 0 | 0.711 | 0.0 | 46.6° | 11.29 | 1.00 | 0.74 |
| 2 | 0.022 | 0.641 | 9.85 | 52.7° | 10.76 | 0.99 | 0.82 |
| 3 | 0.043 | 0.559 | 21.38 | 58.6° | 9.83 | 0.98 | 0.75 |
| 4 | 0.065 | 0.506 | 28.83 | 61.8° | 5.65 | 0.97 | 0.72 |
| 5 | 0.086 | 0.469 | 34.04 | 65.9° | 5.47 | 0.95 | 0.68 |
| 6 | 0.108 | 0.431 | 39.38 | 66.8° | 4.55 | 0.94 | 0.64 |
| 7 | 0.130 | 0.430 | 39.52 | 75.1° | 3.95 | 0.92 | 0.55 |

TABLE IV

Measured Screen Characteristics for Example 3, Assembly 1830

| Sample | Diff. layer (mm) | PG | ΔPG (%) | VA | SC (%) | MD 1.12 | MD 2.52 |
|---|---|---|---|---|---|---|---|
| 1 | 0 | 0.707 | 0.0 | 52.3° | 11.93 | 0.98 | 0.77 |
| 2 | 0.022 | 0.545 | 22.91 | 61.1° | 7.33 | 0.94 | 0.68 |
| 3 | 0.043 | 0.544 | 23.06 | 59.7° | 6.42 | 0.91 | 0.59 |
| 4 | 0.065 | 0.509 | 28.01 | 61.5° | 4.68 | 0.90 | 0.48 |
| 5 | 0.086 | 0.468 | 33.80 | 66.7° | 3.46 | 0.85 | 0.40 |
| 6 | 0.108 | 0.445 | 37.06 | 69.8° | 3.40 | 0.80 | 0.31 |

Figure 19A:
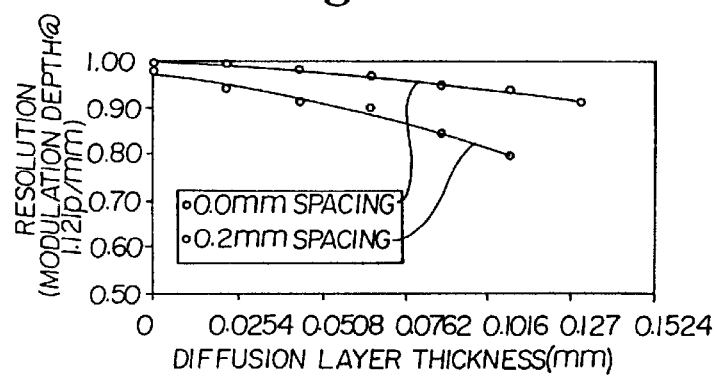
FIGS. 19A and 19B respectively illustrate graphs of speckle contrast and resolution plotted against thickness of the diffuser layer, for Example 3.
Figure 19B:
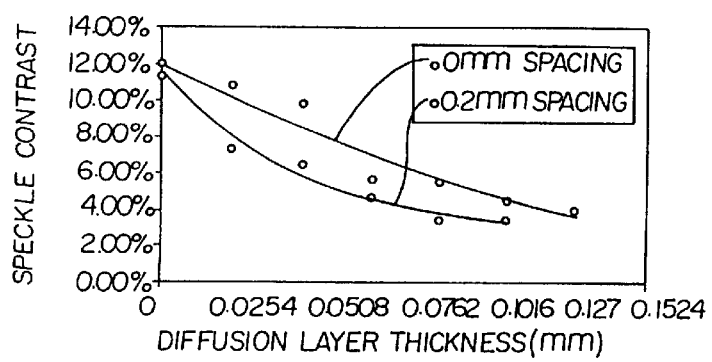

The modulation depth and speckle contrast are shown plotted against thickness of the diffusing layer in FIGS. 19A and 19B respectively. Everything else being equal, the modulation depth is reduced when the diffusing layer thickness increases. However, all the samples in Tables III and IV show a modulation depth that is suitable for HDTV and rear projection monitor applications. The speckle contrast also decreases with increasing diffuser thickness, with several samples from Tables III and IV manifesting a speckle contrast that meets the requirements for HDTV and monitor applications described above. However, these samples show significant reduction in screen gain, which increases the power requirements of the light source used to illuminate the screen in order to achieve a minimum required screen brightness.

Example 4

Figure 20:
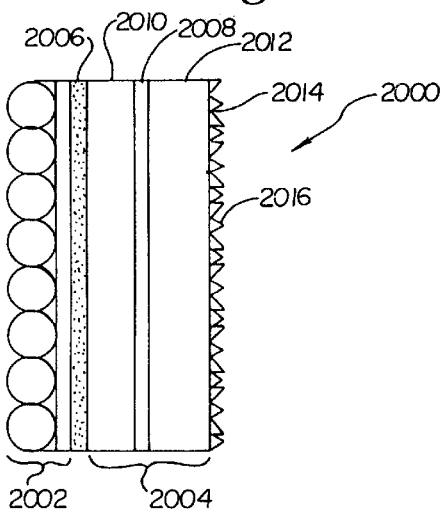
FIG. 20 schematically illustrates the construction of the screen assemble of Example 4.

A screen assembly 2000 was constructed as illustrated in FIG. 20. The screen assembly 2000 included a dispersing layer 2002 similar to layer 1402 illustrated in FIG. 14. The dispersing layer 2002 was laminated to a rigid, clear substrate 2004 using a layer of optical adhesive 2006. The substrate 2004 comprised a 0.051 mm thick diffusive layer 2008, separated on either side by 1.9 mm thick clear acrylic layers 2010 and 2012. The output surface 2014 of the second clear layer 2012 was embossed with a matte surface 2016. Samples having three different diffuser loadings, 0%, 7% and 13%, were prepared and their optical characteristics measured. A summary of the measurements is provided in Table V.

TABLE V

Measured Screen Characteristics for Example 4

| | Diff. Load (%) | PG | ΔPG (%) | VA | SC (%) | MD 1.12 | MD 1.59 |
|---|---|---|---|---|---|---|---|
| 1 | 0.0 | 1.05 | 0.00 | 36.0 | 10.50 | 0.96 | 0.91 |
| 2 | 7.0 | 1.02 | 2.48 | 36.4 | 4.25 | 0.80 | 0.64 |
| 3 | 13.0 | 0.99 | 5.33 | 36.7 | 4.00 | 0.75 | 0.58 |

Figure 21:
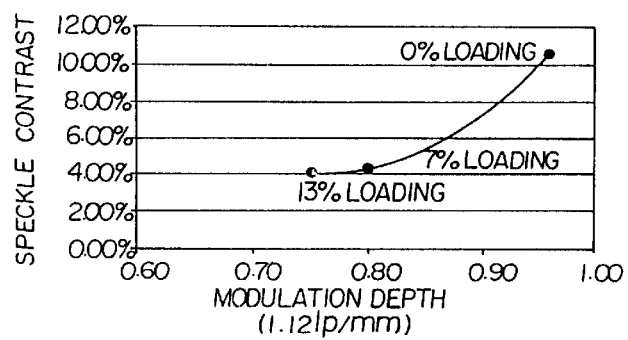
FIG. 21 illustrates a graph showing the relationship between speckle contrast and modulation depth for the samples of Example 4.

The speckle relationship between speckle contrast and modulation depth for these samples is illustrated in FIG. 21, showing that the modulation depth decreases along with the speckle contrast.

Figure 22:
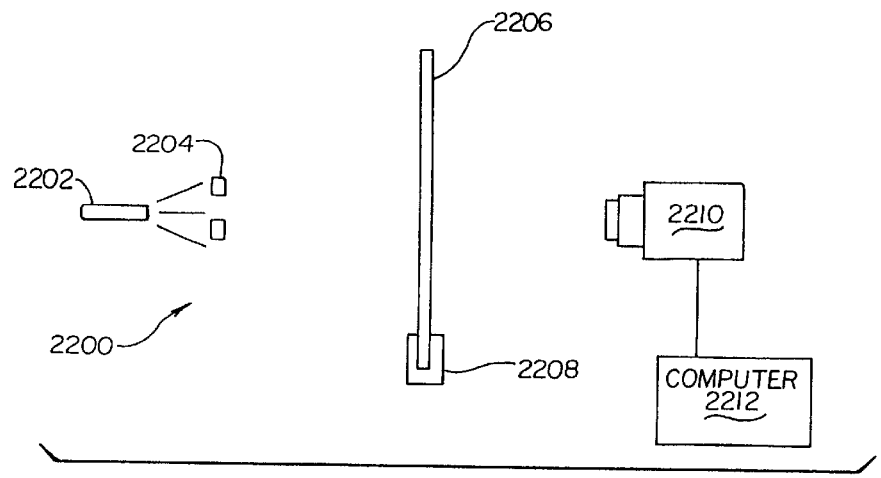
FIG. 22 schematically illustrates an experimental system used for measuring speckle contrast.

The method used to measure the speckle contrast of the samples described above is now described. The speckle contrast measuring system 2200, illustrated in schematic form in FIG. 22, is a variation of the system described by J. F. Goldenberg, Q. Huang, and J. A. Shimizu in "Rear Projection Screens for Light Valve Projection systems" in SPIE vol. 3013, pp. 49–59, 1997, incorporated herein by reference.

A collimated white light source 2202 projects light through an iris 2204 to a sample screen 2206, held in place by a sample holder 2208. A camera 2210 is positioned on the other side of the screen 2206 to detect the light projected from the screen 2206. The camera 2210 is coupled to a computer 2212 equipped with a frame grabber and appropriate software to acquire digital electronic copies of the image detected by the camera 2210.

In the particular system used to measure speckle contrast for the samples, the light source 2202 was a Fostec DCR II, DC regulated source, and was equipped with an iris. The camera 2210 used was a Kodak Megaplus ES 1.0 charge coupled device (CCD) camera. Image Pro Plus software was used to retrieve the image from the camera 2210.

The illumination spot size on the screen 2206 is controlled by the aperture size of the iris 2204. The spot size and the distance between the iris 2204 and the screen 2206 are determined by the coherence length that is being tested for. According to the Goldenberg article referred to above, the coherence length, $\rho$, is related to the half angle subtended by the aperture from the screen, $\theta'$, through the relationship:

$$\rho \approx 0.61 \cdot \lambda_{ave}/\sin(\theta')$$

where $\lambda_{ave}$ is the average wavelength of the light being used to illuminate the aperture. For small angles, $\theta'$, $\sin(\theta') \approx a/2d$, where a is the aperture diameter and d is the separation between the aperture and the screen.

Thus, for a test coherence length of 68 $\mu$m, the illumination spot size was selected to be 4.45 mm (0.175") and the separation between the iris 2204 and the screen 2206 was about 457 mm (18").

With a sample screen 2206 placed in the sample holder 2208, an image of light passing through the screen 2206 is acquired by the camera 2210. One particular example of the measured intensity pattern is illustrated in FIG. 19, which shows intensity, in arbitrary units, plotted against arbitrary pixel number. As discussed earlier, the speckle contrast is defined as the ratio of the standard deviation of the intensity over the average intensity. Since speckle contrast is calculated as a statistical operation on the intensity detected by each pixel in the illuminated area of the detector array, the term "pixel number" need not be indicative of the pixel number for a particular row of the detector array.

Figure 23A:
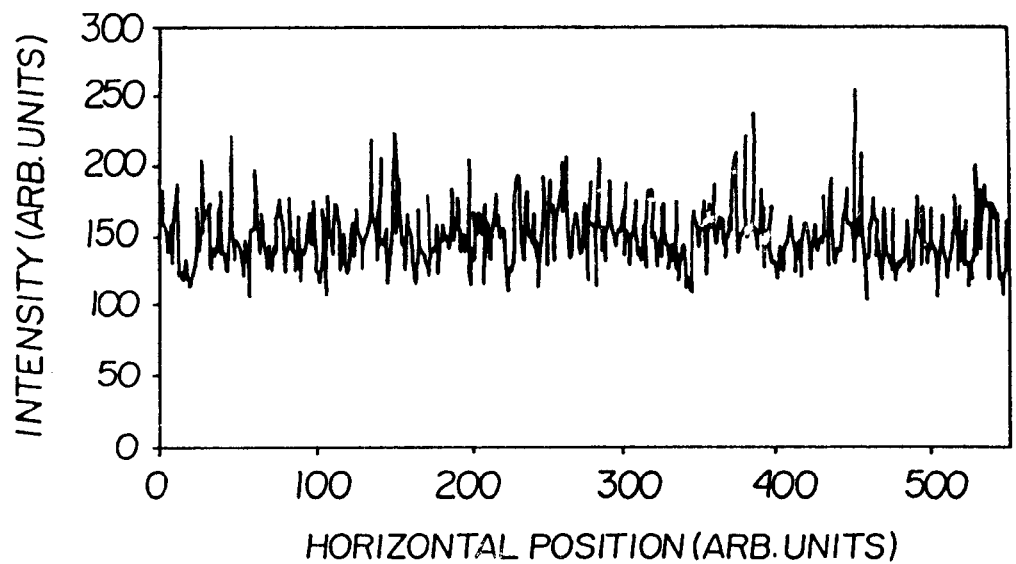
FIGS. 23A and 23B illustrate speckle contrast measurements for two speckle contrast standards.

Two different standard reference diffusers were used for calibrating the speckle contrast measurement system. The first was a ground glass diffuser, obtainable from Edmund Scientific, part no. K45-656. The ground glass diffuser was 100 mm×100 mm×1.625 mm. The ground surface was created by sandblasting the surface using a 120 grit spray. The speckle data obtained using the speckle contrast measurement system is illustrated in FIG. 23A. The average intensity over all pixels was 150.4 and the standard deviation was 22.5, resulting in a speckle contrast of approximately 15%.

Figure 23B:
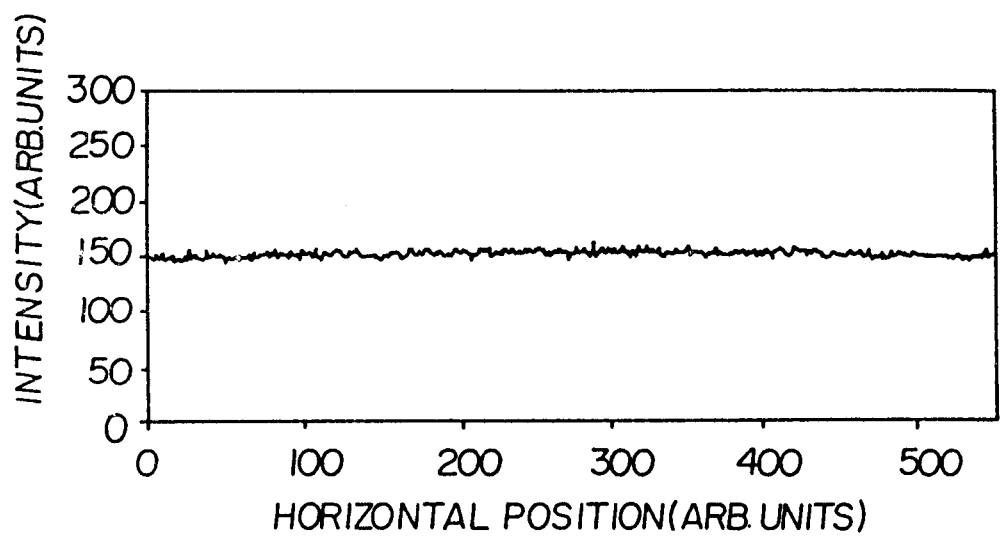

The second standard was an opal glass diffuser, also obtainable from Edmund Scientific as part no. K43-719. The opal glass diffuser was 100 mm×100 mm×3.25 mm and was similar to the ground glass diffuser except that one surface was flashed with a milky white "opal" coating to achieve a Lambertian surface. The speckle data obtained using the speckle contrast measurement system is illustrated in FIG. 23B. The average intensity over all pixels was 151.4 and the standard deviation was 3.1, resulting in a speckle contrast of approximately 2%.

While various examples were provided above, the present invention is not limited to the specifics of the illustrated embodiments. For example, different types of dispersing layers may be used other than those shown for each particular embodiment. Furthermore, additional bonding layers may be used to attach adjacent layers, rather than using lamination.

As noted above, the present invention is believed to be particularly applicable to screens used for rear projection displays. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A screen assembly, having a light-source side and a viewing side, comprising:
   a screen layer to disperse light passing through the screen from the light source side;
   a matte surface disposed on the viewing side of the screen assembly to reduce ambient glare; and
   a first speckle contrast reducing layer disposed between the screen layer and the matte surface to reduce speckle formed at the matte surface.

2. A screen assembly as recited in claim 1, wherein the screen layer is an image-forming, light dispersing element.

3. A screen assembly as recited in claim 2, wherein the image-forming, light dispersing element includes a lenticular lens layer.

4. A screen assembly as recited in claim 2, wherein the image-forming, light dispersing element includes a beaded screen.

5. A screen assembly as recited in claim 2, wherein the image-forming, light dispersing element includes a layer having a two dimensional lenslet arrangement.

6. A screen assembly as recited in claim 2, wherein the first speckle contrast reducing layer is spaced apart from the image-forming, light dispersing element by a distance greater than a distance between the image-forming, light dispersing element and an image plane of the image-forming, light dispersing element.

7. A screen assembly as recited in claim 1, wherein the screen layer is a bulk diffusing element.

8. A screen assembly as recited in claim 1, wherein the first speckle contrast reducing layer is a bulk diffuser layer.

9. A screen assembly as recited in claim 1, further comprising a second speckle contrast reducing layer disposed between the screen layer and the matte surface.

10. A screen assembly as recited in claim 9, wherein the matte surface is formed on a surface of the second speckle contrast reducing layer.

11. A screen assembly as recited in claim 1, further comprising a screen substrate layer disposed between the screen layer and the matte surface.

12. A screen assembly as recited in claim 11, wherein the first speckle contrast reducing layer includes the screen substrate layer.

13. A screen assembly as recited in claim 1, wherein the first speckle contrast reducing layer includes an adhesive layer, scattering particles being disposed within the adhesive layer.

14. A screen assembly as recited in claim 1, wherein a value of speckle contrast for the screen assembly is less than 10%.

15. A screen assembly as recited in claim 1, wherein a value of speckle contrast for the screen assembly is less than 6%.

16. A screen assembly having a light input side and a viewing side, comprising:

screen dispersing means for dispersing light propagating from the light input side of the screen assembly;

glare reducing means on the output side of the screen assembly for reducing ambient glare on the output side of the screen assembly; and first speckle reducing means disposed between the screen dispersing means and the glare reducing means to reduce speckle formed at the glare reducing means.

17. A screen assembly as recited in claim 16, further comprising second speckle reducing means disposed between the screen dispersing means and the glare reducing means.

18. A projection system, comprising:

a projection screen assembly having an input side and an output side, the projection screen assembly including a screen layer to disperse light propagating through the screen assembly from the input side, a matte surface on the output side and a speckle contrast reducing layer disposed between the screen layer and the matte surface to reduce speckle at the matte surface, and a light image source projecting an image of light on to the input side of the screen assembly.

19. A system as recited in claim 18, further comprising a controller coupled to the image light source to control the image of light projected on the screen assembly.

20. A system as recited in claim 18, wherein the projection screen assembly further includes a second speckle reducing layer disposed between the screen layer and the matte surface.

21. A system as recited in claim 18, wherein the speckle contrast of the screen assembly is less than approximately 6% and the modulation depth is at least approximately 50% measured at 1.12 line pairs per mm.

22. A system as recited in claim 18, wherein the speckle contrast of the screen assembly is less than approximately 5% and the modulation depth is at least approximately 70% measured at 1.12 line pairs per mm.

23. A screen assembly, having a light-source side and a viewing side, comprising:

an image-forming screen layer to disperse light passing through the screen from the light source side;

a matte surface disposed on the viewing side of the screen assembly to reduce ambient glare; and a first coherence reducing layer disposed between the screen layer and the matte surface to reduce coherence of light passing from the screen layer to the matte surface.

24. A screen assembly as recited in claim 23, wherein the coherence reducing layer is a diffusing layer.

25. A screen assembly as recited in claim 23, wherein the image-forming screen layer includes a lenticular lens layer.

26. A screen assembly as recited in claim 23, wherein the image-forming screen layer includes a beaded screen.

27. A screen assembly as recited in claim 23, wherein the first coherence reducing layer is spaced apart from the image-forming screen layer by a distance greater than a distance between the image-forming, screen layer and an image plane of the image-forming screen layer.

28. A screen assembly as recited in claim 23, further comprising a second coherence reducing layer disposed between the screen layer and the matte surface.

29. A screen assembly as recited in claim 28, wherein the matte surface is formed on a surface of the second coherence reducing layer.

30. A screen assembly as recited in claim 23, further comprising a screen substrate layer disposed between the screen layer and the matte surface.

31. A screen assembly as recited in claim 30, wherein the first speckle contrast reducing layer includes the screen substrate layer.

32. A screen assembly as recited in claim 23, wherein the first coherence reducing layer includes an adhesive layer, scattering particles being disposed within the adhesive layer to reduce coherence of light passing through the adhesive layer.

33. A screen assembly as recited in claim 23, wherein a value of speckle contrast for the screen assembly is less than 10%.

34. A screen assembly as recited in claim 23, wherein a value of speckle contrast for the screen assembly is less than 5%.

* * * * *